US010179442B2

United States Patent
Keller et al.

(10) Patent No.: US 10,179,442 B2
(45) Date of Patent: Jan. 15, 2019

(54) FLUORESCENT DISPLAYS CONTAINING AN INTERLAYER FILM OF POLYVINYLACETAL WHICH COMPRISES PLASTICIZERS

(71) Applicant: KURARAY EUROPE GMBH, Hattersheim (DE)

(72) Inventors: Uwe Keller, Bonn (DE); Philipp Lellig, Troisdorf (DE); Jan Beekhuizen, Troisdorf (DE)

(73) Assignee: KURARAY EUROPE GMBH, Hattersheim (DE)

( * ) Notice: Subject to any disclaimer, the term of this patent is extended or adjusted under 35 U.S.C. 154(b) by 134 days.

(21) Appl. No.: 14/760,649

(22) PCT Filed: Jan. 10, 2014

(86) PCT No.: PCT/EP2014/050400
§ 371 (c)(1),
(2) Date: Jul. 13, 2015

(87) PCT Pub. No.: WO2014/108508
PCT Pub. Date: Jul. 17, 2014

(65) Prior Publication Data
US 2015/0352814 A1  Dec. 10, 2015

(30) Foreign Application Priority Data
Jan. 11, 2013  (DE) .................. 10 2013 100 268

(51) Int. Cl.
*B32B 17/10*  (2006.01)

(52) U.S. Cl.
CPC .... *B32B 17/10036* (2013.01); *B32B 17/1066* (2013.01); *B32B 17/10651* (2013.01);
(Continued)

(58) Field of Classification Search
CPC ........ G02B 5/201; G02B 5/208; G02B 27/01; B32B 17/10036; B32B 17/10568;
(Continued)

(56) References Cited

U.S. PATENT DOCUMENTS

| 7,312,275 B2 | 12/2007 | Papenfuhs et al. |
| 7,358,304 B2 | 4/2008 | Papenfuhs et al. |
| 7,511,096 B2 | 3/2009 | Papenfuhs et al. |
| 7,528,192 B2 | 5/2009 | Papenfuhs et al. |
| 8,734,953 B2 | 5/2014 | Sablayrolles et al. |

(Continued)

FOREIGN PATENT DOCUMENTS

| EP | 1527107 B1 | 5/2005 |
| EP | 1606325 B1 | 12/2005 |

(Continued)

OTHER PUBLICATIONS

International Search Report for PCT/EP2014/050400, dated Mar. 28, 2014, 2 pages (no translation provided).

*Primary Examiner* — William R Alexander
*Assistant Examiner* — Wen Huang
(74) *Attorney, Agent, or Firm* — Brooks Kushman P.C.

(57) ABSTRACT

A fluorescent display suitable for use in a heads up display contains a laminated glass structure containing a plasticized polyvinyl acetal film, at least one fluorophore, and at least one UV absorber, wherein the fluorophore and UV absorber are and remain spatially separated in the laminating film such that UV light projected from a display generating projector remains able to activate the fluorophores, and a UV component of sunlight has lessened ability to activate the fluorophore.

19 Claims, 2 Drawing Sheets

(52) U.S. Cl.
CPC .. *B32B 17/10669* (2013.01); *B32B 17/10678* (2013.01); *B32B 17/10761* (2013.01); *B32B 2307/102* (2013.01); *B32B 2457/20* (2013.01); *B32B 2605/00* (2013.01); *Y10T 428/3163* (2015.04)

(58) Field of Classification Search
CPC .......... B32B 17/1066; B32B 17/10669; B32B 17/10678; B32B 17/10761; B32B 37/18; B32B 2315/08; B32B 2605/006; B60R 1/001
USPC ........................................................ 359/361
See application file for complete search history.

(56) References Cited

U.S. PATENT DOCUMENTS

| | | | |
|---|---|---|---|
| 2002/0120916 | A1 | 8/2002 | Snider |
| 2010/0210745 | A1* | 8/2010 | McDaniel ............... C09D 5/008 521/55 |
| 2013/0050983 | A1* | 2/2013 | Labrot .................... B32B 17/10 362/84 |
| 2013/0157065 | A1* | 6/2013 | Shimamoto ....... B32B 17/10036 428/442 |

FOREIGN PATENT DOCUMENTS

| | | |
|---|---|---|
| EP | 2409833 A1 | 1/2012 |
| WO | 03020776 A1 | 3/2003 |
| WO | 2004063231 A1 | 7/2004 |
| WO | 2008132368 A2 | 11/2008 |
| WO | 2012072950 A1 | 6/2012 |

\* cited by examiner

FLUORESCENT DISPLAYS CONTAINING AN INTERLAYER FILM OF POLYVINYLACETAL WHICH COMPRISES PLASTICIZERS

CROSS-REFERENCE TO RELATED APPLICATIONS

This application is the U.S. National Phase of PCT Appln. No. PCT/EP2014/050400 filed Jan. 10, 2014, which claims priority to Germany Application No. DE 10 2013 100 268.4 filed Jan. 11, 2013, the disclosures of which are incorporated in their entirety by reference herein.

BACKGROUND OF THE INVENTION

1. Field of the Invention

The invention pertains to an improvement in head-up displays projected onto a safety glass laminate, wherein film between two glass layers.

2. Description of the Related Art

In use today in passenger vehicles are so-called head-up displays (HUD), which reflect information into the driver's field of view. To do so, an image is projected into the windshield from -below from a projector unit located in the dashboard, which can be viewed from the driver's seat as a virtual image. The effect is based on the reflection effect of the glass surface facing the interior of the vehicle, and on the glass surface that faces outward from the vehicle. The inner glass surfaces contribute almost nothing to the reflection since they are glued together by way of a PVB film located between the glass layers as is federally prescribed for composite safety glass, the PVB film having a refractive index similar to glass.

The following convention, shown in FIG. 1, is used to simplify the naming of the four glass surfaces of a typical windshield design:

Side 1 The outer surface of the composite member pane facing the outside of the vehicle Side 2 The inner surface of the outer pane in the composite member facing the interlayer film Side 3 The inner surface of the inner pane in the composite member facing the interlayer film Side 4 The surface of the inner pane of the composite member facing the interior of the vehicle In general, a plasticizer-containing film of polyvinyl butyral, abbreviated as "PVB film,", is used as the interlayer film.

To eliminate double images in a conventional HUD utilizing the functional principle described, the glass surfaces of sides 1 and 4 must be set at a specific angle relative to one another. This is accomplished through the use of PVB films having a wedge-shaped thickness profile. However, such films are difficult to process and complicated in their manufacture, which makes them much more expensive than non-wedge-shaped film counterparts.

Other disadvantages of conventional HUDs are that the information can only be visualized within a limited field of vision directly in front of the driver, and is only visible to the driver. However, there are in fact many situations in which information should be made visible to passengers or projected onto other locations of the windshield. For example, it is conceivable that the contour of obstructions on or next to the road, which are already detected in current vehicles by night vision systems, can be projected directly into the windshield to provide safety-related warning information.

It is also true in conventional HUD's that the image is blurred by raindrops located on the windshield since the refractive index transition between the glass and the air, which is the basis of the optimized system configuration, is compromised.

As an alternative to these conventional HUDs, it has already been proposed that images be generated using fluorescing materials disposed in the plane of the windshield, through excitation of the same so-called "fluorescence HUD". The excitation of these materials is done using UV radiation which is invisible to the human eye, which generates real images in the plane of the windshield that are visible to more than just the driver. Suitable organic dyes, inorganic particles, etc., have been proposed as fluorescing materials.

A known method for manufacturing fluorescence HUDs involves applying fluorescing pigments or dyes in the form of coatings, laminated films or the like onto side 4 of the windshield. An alternative proposal was to position, between side 3 and the PVB interlayer, films containing fluorophores or to print the surface of the PVB film facing side 3 with fluorophores.

WO 2012/072950A1 discloses the printing of a PVB film with certain low molecular weight fluorophores in such a way that they are distributed evenly in the film during the autoclaving process. In this case, the fluorophores also act as UV absorbers. To this end, WO 2012/072950A1 describes the use of low molecular weight hydroxyterephthalates, in particular 2,5-dihydroxydiethyl terephthalate, as a fluorophore, and the use of antioxidants, which are applied to a PVB film. In the process, the fluorophore is distributed in the PVB film and can act as a UV absorber by itself or can mix with an existing low molecular weight UV absorber in the film.

WO2008132368 A9 discloses that the fluorescence HUD can contain one or more layers comprising inorganic luminophores in a thickness of less than 20 um on side 3 of a composite member in addition to a conventional PVB film. However, since conventional PVB films contain low molecular weight UV absorbers in small amounts, such a low molecular weight UV absorber can easily migrate into the layer containing the luminophores and extinguish the fluorescence there. There is also the risk that uncontrolled excitation can be caused by outside sunlight to some degree since conventional PVB films usually exhibit residual transmission for UV radiation. Care must also be taken to ensure that no light scattering occurs due to unsuitably large particles, which can lead to distortion. The small layer thickness of the layers containing the luminophores, which is 20 um, limit the useful amount of fluorophores since distortion occurs when the concentrations are too high. This limits the maximum achievable intensity of the fluorescence emission.

US 2002/0120916 A1 describes head-up displays comprising fluorescent dyes in which the side facing the observer contains UV absorbers. This is intended to prevent excitation radiation for the fluorescent dyes from radiating through the display onto the outer side. To this end, US 2011 1073773 A1 discloses fluorescent displays that comprise an opaque material on the side of the display facing away from the observer.

EP 2409833 describes a fluorescent display in which the fluorescent dyes are disposed on the side facing the sunlight.

These known fluorescent displays have the disadvantage that the fluorescent dyes can be excited by sunlight, which is undesirable. Such an excitation visually results in a distortion of the display, which is unacceptable for use in vehicle windshields.

According to the known prior art, the following problems occur which negatively affect the brilliance and sharpness of the information shown in the display as well as the persistence thereof. PVB films commonly available for the manufacture of automobile glass contain small amounts of low molecular weight UV absorbers, in particular of the Tinuvin 326 and Tinuvin 327 types.

Since the UV absorbers act in precisely the same wavelength range in which the excitation of the fluorophores is to take place, a large portion of the UV radiation is absorbed instead of being available for excitation of the fluorophores.

Therefore, when a low molecular weight fluorophore is simply applied to the surface of a PVB film that already contains a UV absorber, the fluorophore will distribute throughout the entire thickness of the film through diffusion. The fluorophore can then only emit in the direct vicinity of the glass surface since this is the only place where UV radiation impacts the fluorophore in sufficient intensity since it cannot significantly penetrate into the film layer due to the existing UV absorbers. This necessitates high concentrations of fluorophores in order to achieve a sufficient brilliance, which in turn can have a negative effect on the yellow tint of the film or glazing and on the costs of the display system. Of course, the same applies when the fluorophore is added to the PVB film directly as an additive during manufacture of the film.

It is especially complicating that fluorophores migrate as well to side 2 of the windshield (see FIG. 1) by way of diffusion, where on the one hand they can bleach out due to sunlight since there is no more protection provided at this point by UV absorbers contained in the film, and on the other hand they can be uncontrollably excited to a state of fluorescence by the UV fraction of the solar radiation.

SUMMARY OF THE INVENTION

It is therefore an object of the invention to provide interlayer films for fluorescent displays made of glass/glass laminates in which the aforesaid disadvantages cannot physically occur.

DETAILED DESCRIPTION OF THE PREFERRED EMBODIMENTS

It has surprisingly and unexpectedly been found that these and other objects are met by an interlayer or a combination of interlayers in which UV absorbers and a fluorophore can be permanently spatially separated from one another or in which a high concentration of fluorophore is maintained near side 3 meet these prerequisites.

Figure 1:
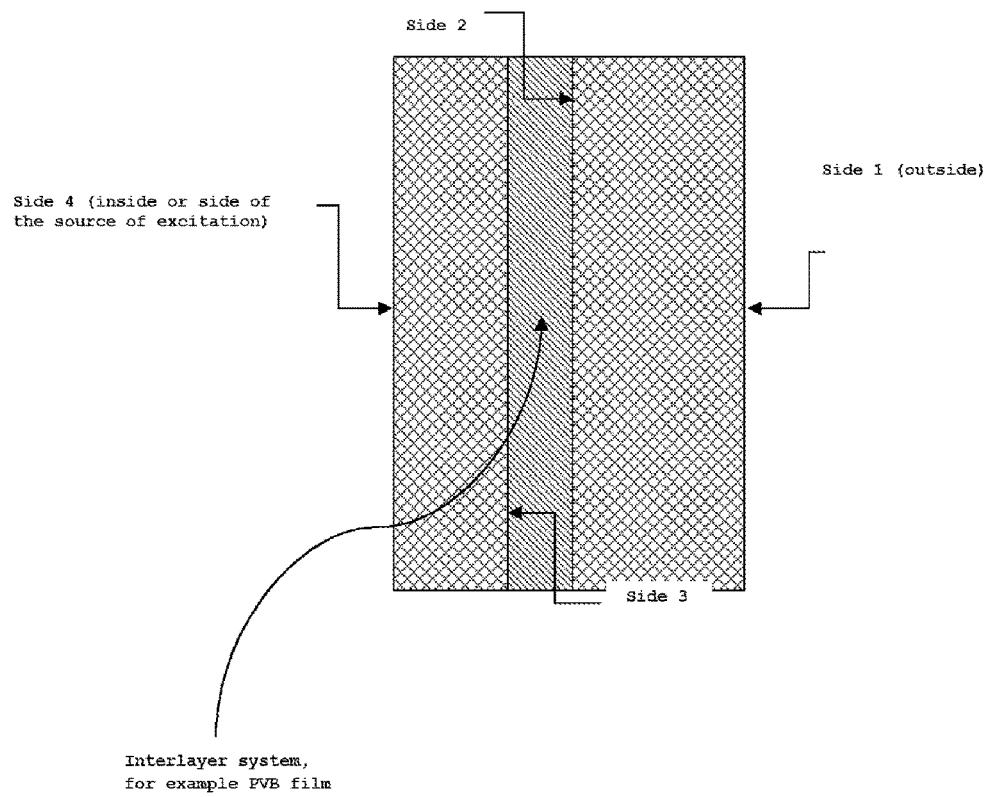
FIG. 1 depicts the numbering convention for various glass/glass laminates used in describing the invention.
Figure 2:
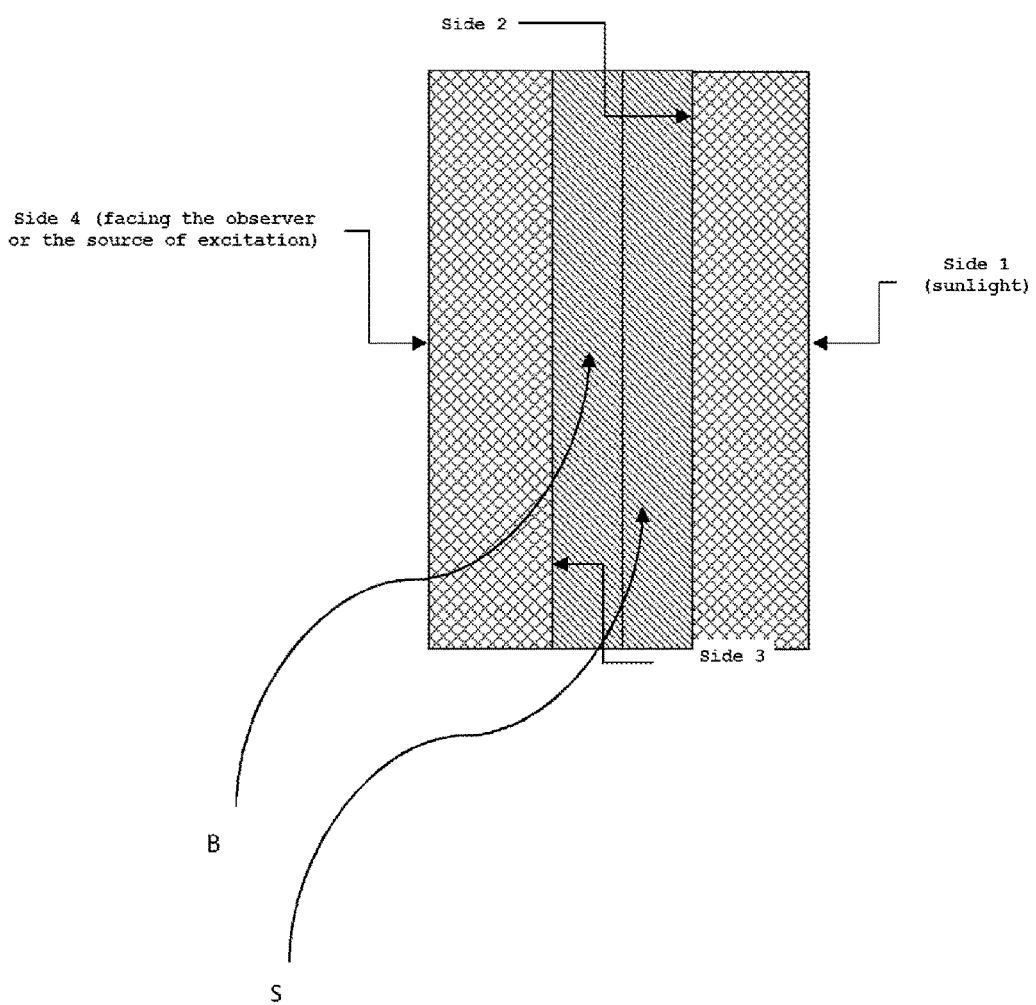
FIG. 2 illustrates one embodiment of an inventive glass/glass laminate.

The invention uses the above-mentioned convention for naming the surfaces of a glass/glass laminate as shown in FIG. 1 for fluorescence displays that comprise glass/glass laminates for other application fields such as display units for use in construction and advertising areas, etc. Side 4 identifies the side facing the source for the excitation radiation.

In particular, the intermediate layer abutting side 2 of the fluorescent display should exhibit high light transmission and at the same time low UV transmission. This results in the following effects: protection of the fluorophore located behind the layer against bleaching, preventing UV radiation from leaving the excitation source, preventing uncontrolled excitation due to the UV portion of sunlight, and ensuring that the overall component has the normally required low UV transmission.

The object of the present invention is therefore a fluorescent display comprising a glass/glass laminate with a side S facing the sunlight and a side B facing the observer of the fluorescence display, with at least one interlayer film comprising UV absorbers, fluorophores and plasticizer-containing polyvinyl acetal, wherein the UV absorbers and the fluorophores in the interlayer are disposed spatially such that the fluorophores are excited by the UV radiation without the UV absorbers absorbing the same, wherein the UV absorbers are disposed proximate side S of the fluorescence display, the side facing the sunlight.

In an exemplary application of the fluorescent display as a windshield of a motor vehicle, this arrangement makes it possible for the fluorophores to be excited by UV radiation from the interior of the vehicle or from side 4 of a display unit without the radiation, which is provided specifically for purposes of excitation, being absorbed by the UV absorbers.

In a first embodiment of the invention, the fluorescent display comprises an interlayer film that includes
- at least one first layer of plasticizer-containing polyvinyl acetal and at least one conventional low molecular weight UV absorber, the layer being disposed proximate side S of the fluorescence display
- at least one thin layer as a diffusion barrier for fluorophore and low molecular weight UV absorbers and
- at least one second layer of plasticizer-containing polyvinyl acetal and/or polyurethane and/or EVA, also comprising one or more fluorophores, and not containing any low molecular weight UV absorbers, or containing a UV absorber which does not absorb radiation in the selected excitation wavelength of the fluorophores, this second layer being disposed proxmiate side B of the fluorescence display.

The thin layer acting as a diffusion barrier is preferably a thin film of PET or modified PET.

In the case of a non-modified PET, it is preferred to use biaxially stretched PET, and in the case of a modified PET it is preferred to use PETG (poly(cyclohexanedimethylene terephthalate-co-ethylene terephthalate). Also useful as diffusion barriers are layers of polyvinyl alcohol or ethylene-modified polyvinyl alcohol (for example Exceval®) as well as ethylene-vinyl alcohol copolymers (such as EVAL®).

The fluorophore or fluorophores can be introduced into the interlayer combination or second layer during the manufacture thereof, for example in an extrusion process. Alternatively, it is also possible to apply the same onto one of the surfaces of the second layer. In principle any suitable coating, printing, transfer, or spraying process, etc., are possible choices for this purpose. The application can also be done during the lamination step by first providing the fluorophore or fluorophores on the surface corresponding to side 3 in the composite member or on the layer which acts as the diffusion barrier.

Likewise, the fluorophore or fluorophores can be permanently applied to the surface of the thin, film-like layer that acts as the diffusion barrier and faces the excitation source, the application being done in a printed or coated form. In addition or alternatively, the thin layer that acts as a diffusion barrier can be provided on the surface thereof facing away from the excitation source with an infrared radiation absorbing or reflecting coating.

If the fluorophores are left out, the second layer can have a UV transmission of more than 10, preferably 20, preferably more than 35 and most preferred more than 50% according to EN 410 in a layer thickness of 0.38 mm in a measurement between 2×2 m Planilux.

It is preferable for the first and second layer to comprise a plasticized polyvinyl acetal, in particular plasticized polyvinyl butyral, (n- and/or isobutyral), PU or EVA.

In a second embodiment of the invention, the fluorescent display according to the invention comprises an interlayer film that includes
- at least one first layer of plasticized polyvinyl acetal and a conventional low molecular weight UV absorber, the layer being disposed proximate side S of the fluorescent display
- a fluorophore disposed on or at said layer and having a low tendency to diffuse, disposed on side B of the fluorescence display.

Fluorophores with a low tendency to diffuse can be: fluorescing organic polymers, fluorophores with ionic groups, fluorescing nanoparticles, and fluorophores that are very insoluble in plasticizers of conventional films (less than 5 g/L at 20° C.)

The advantage of this embodiment is that the fluorophore remains in a high local concentration at side 3 directly adjacent to the boundary. The film layer therebehind does contain a UV absorber which is capable of migrating, but the absorber cannot migrate in front of the fluorophores.

The fluorophores can be printed, applied by way of coating or spraying or in the form of laminated thin films additionally introduced into the glass/glass laminate between the conventional film and glass side 3, or can have been introduced into a layer that is extruded onto the conventional film.

In a third embodiment of the invention, the fluorescent display according to the invention comprises an interlayer film that includes
- at least one first layer of plasticized polyvinyl acetal, the layer comprising a UV absorber with a low tendency to diffuse, the layer being disposed on side S of the fluorescence display
- fluorophore disposed on or at said layer and having a low tendency to diffuse, disposed on side B of the fluorescence display.

UV absorbers that do not diffuse or that diffuse very little can be the following, in particular: polymeric UV absorbers such as polycrylene SI by Hallstar, UV absorbers with ionic groups, UV absorbing nanoparticles, organic UV absorbers present as particles in the film matrix. This first film is free of the usual low molecular weight UV absorbers or only contains those which do not absorb at the excitation wavelength of the fluorophores (for example UV-B absorbers such as Sandovur VSUC).

In a first variant of this embodiment, the first layer/film is printed with fluorophores with a low tendency to diffuse.

In a second variant of this embodiment, a second film or layer is applied to side 3, the second layer comprising fluorophores with a low tendency to diffuse.

In a fourth embodiment of the invention, the fluorescent display according to the invention comprises an interlayer film that includes
- at least one first layer of plasticized polyvinyl acetal and a UV absorber which is incapable or only very slightly capable of diffusing, the layer being disposed on side S of the fluorescence display
- at least one second layer that is free of UV absorbers but contains a fluorophore, preferably fluorophores with a low tendency to diffuse, the layer being disposed on side B of the fluorescence display.

In this embodiment, the fluorophores can only be contained in specific areas of the layers, which leads to a fluorescent band instead of a color band/color strip, which is common in windshields. It is also possible to equip the layer on the inner side with a fluorescent band and on the outer side with a pigmented color band to increase the contrast.

In a fifth embodiment of the invention, the fluorescent display according to the invention comprises an interlayer film that includes
- at least one first layer of plasticized polyvinyl acetal and one of the usual low molecular weight UV absorbers, the layer being disposed on side S of the fluorescent display
- at least one thin film as a diffusion barrier containing a fluorophore, the film being disposed on side B of the fluorescent display
- at least one second layer of plasticized polyvinyl acetal and no UV absorbers or a UV absorber that does not absorb at the selected excitation wavelength of the fluorophore. The fluorophore used in the second layer does not have to be diffusion-limited.

In the embodiments mentioned above, useful compounds for use as low molecular weight (conventional) UV absorbers with a high diffusivity include compounds of the benzotriazole type such as the types Tinuvin P, Tinuvin 328, Tinuvin 326, Tinuvin 327 or substituted phenyltriazines of the type Tinuvin 1577 or Cyasorb 1164.

In the embodiments of the invention mentioned above, materials that are useful as UV absorbers with zero or very low diffusivity include nanoparticles, for example nano-$TiO_2$, UV-absorbing polymers, UV absorbers that are very insoluble in the present matrix, for example absorbers of the benzoxazinone type, UV absorbers that comprise weakly-substituted diphenyl-hydroxyphenyl triazine type ionic groups, UV absorbers that are chemically linked to the polyvinyl acetal, for example those based on benzotriazole, polymer-bonded crylene or alkoxycrylene groups, in particular those with an alkoxy group in one of the phenyl rings, for example as are listed in U.S. Pat. No. 7,964,245 B2, UV-absorbing polymers such as are identified in U.S. Pat. No. 7,008,618 B1 or substituted 2-hydroxyphenyl benzotriazoles that are bonded to a polymer by way of an ester group, for example, in particular that are bonded to a polyvinyl acetal.

In the case of polyvinyl acetal which contains plasticizers, UV absorbers that have a solubility in the respective plasticizer of less than 5 g/L at 20° C. are considered to be very insoluble. An example of this is Cyasorb UV 3638F.

According to the invention, the UV absorbers can be used at a concentration of 0.005-5 wt %, preferably 0.1 to 2 wt %, more preferably 0.2-1.0 wt % and in particular 0.1-0.8 wt % (based on the layer containing the UV absorbers, respectively).

In the embodiments of the invention listed above, the following can be used as low molecular weight fluorophores: known laser dyes, typical fluorescence dyes such as substituted coumarins, acridines and rare earth metal complexes.

In the embodiments of the invention listed above, the following can be used as fluorophores with no tendency, or very little tendency, to diffuse: fluorescing inorganic nanoparticles, fluorescent dyes that are very insoluble in the surrounding matrix, such as substituted perylenes or rylenes or descendants of quinacridone, fluorescence dyes with ionic groups or with ionic character, such as uranine, for example, as well as polymeric fluorophores.

In general, fluorescing polymers that contain light-emitting units within the polymer chain or that are linked to a polymer chain can be used as polymeric fluorophores. To minimize the tendency for such a polymer to diffuse in the surrounding matrix, useful fluorescing polymers according to the invention should have a molecular weight Mn of more than 2000, preferably more than 5000 and most preferably more than 10,000 g/mol.

The local concentration of the fluorescing polymers in or at the surrounding matrix is selected such that a high fluorescence is obtained and that there is no significant loss of fluorescence.

Examples of fluorescing polymers that can be used within the scope off the invention include the following, among many others: poly(9-anthracenylmethyl acrylate), poly(9-anthracenylmethyl methacrylate), poly(3,3',4,4'-benzophenonetetracarboxylic dianhydride-alt-acridine Yellow G), poly(3,3',4,4'-benzophenonetetracarboxylic dianhydride-alt-3,6-diaminoacridine hemisulfate), poly(fluorescein O-acrylate), poly(fluorescein O-methacrylate), poly[(methyl methacrylate)-co-(7-(4-trifluoromethyl)coumarin acrylamide)], poly[(methylmethacrylate)-co-(9-anthracenylmethyl methacrylate)], poly[(methyl methacrylate)-co-(7-(4-trifluoromethyl)coumarin methacrylamide)], poly(pyromellitic dianhydride-alt-acridine yellow G), poly(1,4-phenylene) (PPP), polyfluorene (PFO), poly(thiophene), polyquinoline, poly[2,5-bis(3',7'-dimethyloctyloxy)-1,4-phenylenevinylene], poly[9,9-bis-(2-ethylhexyl)-9H-fluorene-2,7-diyl], poly[2-(2',5'-bis(2"-ethylhexyloxy)phenyl)-1,4-phenylenevinylene], poly{[2-[2',5'-bis(2"-ethylhexyloxy)phenyl]-1,4-phenylenevinylene]-co-[2-methoxy-5-(2'-ethylhexyloxy)-1,4-phenylenevinylene]}, poly[2,5-bisoctyloxy)-1,4-phenylenevinylene], poly(2,5-bis(1,4,7,10-tetraoxaundecyl)-1,4-phenylenevinylene), poly(3-cyclohexylthiophene-2,5-diyl), poly(9,9-di-n-dodecylfluorenyl-2,7-diyl), poly[(9,9-dihexylfluorene-2,7-diyl)-co-(anthracene-9,10-diyl)], poly[(9,9-dihexylfluorene-2,7-diyl)-alt-(2,5-dimethyl-1,4-phenylene)], poly(9,9-n-dihexyl-2,7-fluorene-alt-9-phenyl-3,6-carbazol), poly[(9,9-dihexylfluorene-2,7-diyl)-co-(9-ethylcarbazol-2,7-diyl)], poly(2,5-dihexyloxy-1,4-phenylenevinylene), poly(9,9-di-n-octylfluorenyl-2,7-diyl), poly(3-octylthiophene-2,5-diyl), poly(3-octylthiophene-2,5-diyl), poly[(o-phenylenevinylene)-alt-(2-methoxy-5-(2-ethylhexyloxy)-p-phenylenevinylene)], poly[tris(2,5-bis(hexyloxy)-1,4-phenylenevinylene)-alt-(1,3-phe nylenevinylene)], poly[(1,4-phenylene-1,2-diphenylvinylene)], polyquinoline The excitation of the fluorophores used according to the invention is preferred to be done through radiation in the invisible light range, such as in the wavelength range 300-420 nm, preferably in the wavelength range 350-400 nm. Particularly useful radiation sources include UV lasers or UV LEDs.

The interlayer films used according to the invention, in particular the interlayer films in or at which the fluorophores are disposed, can comprise preferably one or more layers of plasticized polyvinyl acetal, the layers preferably:

a. having an alkali titer in the range of 0-50, preferably 0-40, more preferably 0-35, and most preferably 5-35. This prevents decomposition of the fluorophores due to free acids or high alkalinity.

b. containing light stabilizers such as those of the HAS/HALS/NOR-HALS (sterically hindered amino ethers) type so as to suppress radical chain reactions c. containing phenolic antioxidants such as BHT of the type Lowinox 44B25 or Irganox 245.

d. containing an acoustically-damping layer so that the interlayer film according to the invention has a 1st mode loss factor of more than 0.15, preferably more than 0.20, and most preferably more than 0.25 during lamination between 2×2.1 mm glass and measured according to ISO TS 16940 at 20° C. The acoustically-damping layer can also comprise plasticized polyvinyl acetal.

Light stabilizers can, in particular, be sterically hindered amines of the type HAS/HALS/NOR-HALS (sterically hindered amino ethers such as the commercially available products Tinuvin 123 (NOR-HALS), Tinuvin 144, Tinuvin 622, Tinuvin 770 and di-N-methylated derivatives thereof, made by Ciba Specialities. Especially well-suited are ADK Stab LA-57, LA-52 or LA-62 made by Asahi Denka Co. or UVINUL 4050 H by BASF AG.

Light stabilizers are used at a fraction of 0.001 to 1 wt % in particular (based on the film mixture).

The side or layer S facing the sunlight preferably has a UV transmission $T_{uv}$ (400) of, in order of increasing preference, less than 30%, less than 20%, less than 15%, less than 8%, less than 6%, less than 5%, especially less than 4%, preferably less than 3% and most preferably less than 2% in composite measurements between 2×2.1 mm clear glass according to ISO 13837, Convention "A" (2008).

The side or layer S facing the sunlight has a UV transmission $T_{uv}$ of, in increasing order of preference, not more than 50%, not more than 30%, not more than 15%, not more than 10%, not more than 5%, preferably not more than 3%, especially not more than 2% and most preferably not more than 1% in composite measurements between 2×2.1 mm clear glass and with recording of a UV/VIS transmission spectrum according to ISO 13837 (2008).

Other objects of the invention include the use of the fluorescence display according to the invention, the display comprising glass/glass laminates using an interlayer film having the properties and/or compositions cited, as motor vehicle windshields, motor vehicle side glazing, glazing for aircraft, trains or ships and for use in the construction area such as for shop windows, elevators or facade glazing.

To this end, in another variant side 4 of the glass/glass laminate can be provided with a surface (coating) that is anti-reflecting in a wavelength range of 280-420 nm.

In another variant of this glass/glass laminate, the inner glass pane can have a smaller thickness than the outer glass pane to make irradiation therethrough easier. For motor vehicle applications, the outer pane is preferred to have a thickness of less than/equal to 3 mm, more preferably less than 2.6 mm, and most preferably less than 2 mm. The associated inner pane is preferred to have a thickness of less than/equal to, in order of increasing preference 2.6 mm, 2.2 mm, 2.0 mm, and most preferably 1.8 mm, 1.6 mm.

Another object of the invention is a motor vehicle passenger cell with a windshield comprising a fluorescence display according to the invention which is made of glass/glass laminates, the display using an interlayer film having the properties and/or compositions cited, and side panes and optionally a transparent ceiling module comprising or containing UV absorbing glass. This protects the fluorescence display in the windshield against irradiation by outside light, and the loss of contrast or uncontrolled excitation associated therewith. The UV-absorbing glass can be a UV-absorbing monolithic glass or a compound glass with a common PVB film which contains UV absorbers, for example. It is preferable for the UV-absorbing glass cited to have a UV transmission of less than 10% and preferably less than 4% according to the evaluation and measurement according to ISO 13837, Convention" A" (2008).

Interlayer films used according to the invention can be manufactured by way of laying together individually-extruded film sections or preferably by way of co-extrusion of the film sections.

Polyvinyl acetal interlayer films used according to the invention can contain plasticizers or plasticizer mixtures that comprise at least one of the following plasticizers, which are known plasticizers for PVB film: di-2-ethylhexylsebacate (DOS), di-2-ethylhexyladipate (DOA), dihexyladipate (DHA), dibutylsebacate (DBS), triethylene glycol-bis-n-heptanoate (3G7), tetraethylene glycol-bis-n-heptanoate (4G7), triethylene glycol-bis-2-ethylhexanoate (3GO or 3G8) tetraethylene glycol-bis-n-2-ethylhexanoate (4GO or 4G8), di-2-butoxyethyladipate (DBEA), di-2-butoxyethoxyethyladipate (DBEEA), di-2-butoxyethylsebacate (DBES), di-2-ethylhexylphthalate (DOP), di-isononylphthalate (DINP), triethylene glycol-bis-isononanoate, triethylene glycol-bis-2-propylhexanoate, 1,2-cyclohexanedicarboxylic acid diisononyl ester (DINCH), tris(2-ethylhexyl)phosphate (TOF) and dipropylene glycol benzoate.

Interlayer films comprising polyvinyl acetal used according to the invention preferably have a plasticizer content of 18 to 36 wt. % and more preferably 22 to 30 wt. %.

Interlayer films used according to the invention may contain other additives known to one trained in the art, such as residual amounts of water, UV absorbers, antioxidants, adhesion regulators, optical brighteners, stabilizers, coloring agents, processing aids, organic or inorganic nanoparticles, pyrogenic silica and/or surface-active substances.

Adhesion regulators (anti-adhesives) as understood within the scope of the present invention are compounds with which the adhesion of plasticized polyvinyl acetal films onto glass surfaces can be adjusted. Compounds of this type are known to one skilled in the art; in practice, alkali salts or alkaline earth salts of organic acids are frequently used, such as potassium/magnesium acetate or corresponding carboxylates with more than 2 C atoms.

To manufacture polyvinyl acetal, polyvinyl alcohol is dissolved in water and acetalized with an aldehyde such as butyraldehyde under the addition of an acid catalyst. The precipitated polyvinyl acetal is separated, washed to become neutral, optionally suspended in an alkalinity-adjusted aqueous medium, once again washed to neutral and then dried.

The polyvinyl alcohol content of polyvinyl acetal can be adjusted by way of the amount of aldehyde used in the acetalization. It is also possible to carry out the acetalization using other aldehydes or multiple aldehydes having 2-10 carbon atoms (for example n- and/or iso-butyraldehyde, valeraldehyde).

The films which are based on polyvinyl acetal with the plasticizers are preferred to contain non-crosslinked polyvinyl butyral (PVB) produced through acetalization of polyvinyl alcohol with butyraldehyde.

The use of cross-linked polyvinyl acetals, in particular cross-linked polyvinyl butyral (PVB), is also possible. Suitable cross-linked polyvinyl acetals include those described in EP 1527107 B1 and WO 2004/063231 A1 (thermally self-crosslinking of polyvinyl acetals that contain carboxyl groups), EP 1606325 A1 (polyvinyl acetals cross-linked with polyaldehydes) and WO 03/020776 A1 (polyvinyl acetals cross-linked with glyoxylic acid). Reference is made to the full scope of the disclosures in these patent applications.

Within the scope of the present invention, terpolymers of hydrolyzed vinyl acetate/ethylene copolymers can also be used as polyvinyl alcohol. These compounds are in general hydrolyzed up to more than 92 mol % and contain 1 to 10 wt. % of units based on ethylene (for example of the "Exceval" type by Kuraray Europe GmbH).

Within the scope of the present invention, polyvinyl alcohols also include hydrolyzed copolymers of vinyl acetate and at least one other ethylenically unsaturated monomer.

Within the scope of the present invention, the polyvinyl alcohols can be used in pure form or as a mixture of polyvinyl alcohols of varying degrees of polymerization or degrees of hydrolysis.

Interlayer films used according to the invention can contain polyvinyl acetals having a fraction of polyvinyl acetate groups of between 0.1 and 11 mol %, preferably 0.1-4 mol %, more preferably 0.1-2 mol % and when used as an acoustically-damping supplemental layer between 5 and 8 mol %.

To manufacture the interlayer films used according to the invention, film sections can first of all be individually produced by way of extrusion and then mechanically joined by rolling the sections up together onto a film winding.

It is also possible to manufacture the interlayer film by simultaneous co-extrusion of the film sections. The co-extrusion can be done using a suitably-equipped multi-layer nozzle or a feed block, for example.

In the automobile sector, films are frequently used which comprise a so-called color band in the upper range. To this end, either the upper portion of the film can be co-extruded with a suitably colored polymer melt or one of the film sections in a multi-layered system can have a different color. This is also possible in the present invention by coloring at least one film section entirely or partially.

The manufacture of the interlayer films used according to the invention is generally done by way of extrusion or co-extrusion, which are carried out under specific conditions (melting pressure, melting temperature and tool temperature), whereupon a melt fracture surface is obtained, in other words a stochastic surface roughness.

Alternatively, a pre-made interlayer film can be imprinted with a regular, non-stochastic roughness by way of a stamping process between at least one pair of rolls. Imprinted films generally exhibit improved ventilation behavior in composite glass manufacturing and are preferred in the automobile sector.

Interlayer films used according to the invention have a surface structure applied to one side, or especially preferred to both sides, independent of the manufacturing method, the structure having a roughness $R_z$ of 15 to 150 μm, preferably an $R_z$ of 15 to 100 μm, more preferably an $R_z$ of 20 to 80 μm and in particular a $R_z$ of 30 to 75 μm.

EXAMPLES

Unwanted excitation of the fluorophore leads to a distortion of the film, which can be determined through the Haze value using a Colorquest XE device, Light Type C/2° according to ASTM D 1003.

The Haze value of interlayer films containing fluorescence dyes was determined in order to simulate the fluorescence occurring due to an unwanted excitation of the dyes. The interlayer films were laminated between two 2×2 mm Planilux glass panes.

In this measurement, the light source of the measuring device represents solar radiation (visible light+UV) that acts on the fluorescing film from the outside (side S) and leads to an artificial haze since the dye is excited unintentionally. The detector is disposed on side B (observer).

In comparison example C1, a laminate of fluorescing film/PET film and a film having standard UV protection (V2) was placed in front of the light source.

In example 1, a [laminate] of fluorescing film, PET film and a film having UV protection according to the invention was placed in front of the light source.

The PET film was 23 µm thick and served to spatially separate the fluorophores and the UV absorber.

| Example | Haze according to Colorquest XE, Light Type C/2° as per ASTM D | Layer thickness of the fluorescing PVB film | Layer thickness of the PVB film with UV absorbers |
|---|---|---|---|
| C1 | 1.19 | 0.38 mm | 0.76 mm |
| 1 | 0.46 | 0.38 mm | 0.76 mm |

When using standard UV protection, the unwanted excitation of the dye is not sufficiently prevented. This causes the distortion to be greater than 1, which is an unacceptable value for a visually clear glass pane.

It is only the UV protection according to the invention which filters out the UV light to the required degree so that the unwanted fluorescence is suppressed and the distortion/haze decreases to an acceptable value.

What is claimed is:

1. A visually observable fluorescent display comprising a glass/glass laminate with a side S facing away from an observer of the fluorescent display and a side B facing the observer of the fluorescent display, comprising at least one interlayer film comprising one or more fluorophores, each fluorophore having an excitation wavelength, one or more UV absorbers different from the fluorophores, and plasticized polyvinyl acetal, wherein the UV absorbers and the fluorophores in the interlayer film are disposed spatially separately from each other in a thickness direction of the interlayer film such that the fluorophores are excited by UV radiation impinging upon the laminate through side B despite the presence of the UV absorbers, wherein the UV absorbers are disposed facing side S of the fluorescent display, the at least one interlayer film comprising:
    a) at least one first layer of plasticized polyvinyl acetal, said first layer comprising at least one UV absorber with a low tendency to diffuse, said first layer being disposed towards side S of the fluorescence display, and
    b) at least one fluorophore disposed in said first layer, each fluorophore having a low tendency to diffuse, said fluorophore(s) being disposed towards side B of the fluorescent display,
    wherein the low tendencies of the fluorophore and UV absorber to diffuse are both such that any diffusion does not prevent excitation of the fluorophore by light impinging upon side B to provide a visible display.

2. The fluorescent display of claim 1, wherein the interlayer film comprises at least one layer of plasticized polyvinyl acetal further comprising at least one light stabilizer for suppressing radical chain reactions.

3. The visually observable fluorescent display of claim 1, wherein the UV absorbers having a low tendency to diffuse are polymeric UV absorbers, UV absorbers containing ionic groups, UV absorbing inorganic nanoparticles, organic UV absorbers which are insoluble in the plasticized polyvinyl acetal, UV absorbers chemically bonded to the polyvinyl acetal, UV absorbers having a solubility in the plasticizer of the plasticized polyvinyl acetal of less than 5 g/L at 20° C., or mixtures thereof and wherein the fluorophore having a low tendency to diffuse is a fluorophore selected from the group consisting of fluorescing organic polymers, fluorescing inorganic nanoparticles, and fluorophores having a solubility in the plasticizer of the plasticized polyvinyl acetal film of less than 5 g/L at 20° C., fluorophores containing ionic groups, and mixtures thereof.

4. The visually observable fluorescent display of claim 1, wherein the side S facing the sunlight exhibits a UV transmission $T_{uv}(400)$ of less than 30% in a composite measurement between 2×2.1 mm clear glass according to ISO 13837, Convention "A" (2008).

5. The visually observable fluorescent display of claim 1, wherein the side S facing the sunlight exhibits a UV transmission $T_{uv}$ of not more than 50% in a composite measurement between 2×2.1 mm clear glass and with the recording of a UV/VIS transmission spectrum according to ISO 13837 (2008).

6. A visually observable fluorescent display comprising a glass/glass laminate with a side S facing away from an observer of the fluorescent display and a side B facing the observer of the fluorescent display, comprising at least one interlayer film comprising one or more fluorophores each having an excitation wavelength, a UV absorber different from the fluorophores, and plasticized polyvinyl acetal, wherein the UV absorbers and the fluorophores in the interlayer are disposed spatially separately from each other such that the fluorophores are excited by UV radiation despite the presence of the UV absorbers, wherein the UV absorbers are disposed towards side S of the fluorescent display, the at least one interlayer film comprising:
    a) at least one first layer of plasticized polyvinyl acetal,
    b) at least one fluorophore, disposed at a first side of said first layer of plasticized polyvinyl acetal facing side B of the fluorescent display, each fluorophore having a low tendency to diffuse, and
    c) at least one UV absorber having a low tendency to diffuse disposed in a second side of said first layer, said UV absorber being disposed toward side S of the fluorescent display, the low tendencies of the fluorophore and UV absorbers to diffuse being such that any diffusion does not prevent excitation of the fluorophore by light impinging upon side B to provide visible display.

7. The fluorescent display of claim 6, wherein the interlayer film comprises at least one layer of plasticized polyvinyl acetal further comprising at least one light stabilizer for suppressing radical chain reactions.

8. The visually observable fluorescent display of claim 6, wherein the UV absorber having a low tendency to diffuse are polymeric UV absorbers, UV absorbers containing ionic groups, UV absorbing inorganic nanoparticles, organic UV absorbers which are insoluble in the plasticized polyvinyl acetal, UV absorbers chemically bonded to the polyvinyl acetal, or UV absorbers having a solubility in the plasticizer of the plasticized polyvinyl acetal of less than 5 g/L at 20° C. or mixtures thereof, and wherein the fluorophore having a low tendency to diffuse is a fluorophore selected from the group consisting of fluorescing organic polymers, fluorescing inorganic nanoparticles, and fluorophores having a solubility in the plasticizer of the plasticized polyvinyl acetal film of less than 5 g/L at 20° C., fluorophores containing ionic groups, and mixtures thereof.

9. The visually observable fluorescent display of claim 6, wherein the side S facing the sunlight exhibits a UV transmission $T_{uv}(400)$ of less than 30% in a composite measurement between 2×2.1 mm clear glass according to ISO 13837, Convention "A" (2008).

10. The visually observable fluorescent display of claim 1, wherein the plasticizer content of the interlayer film is from 18 to 36 weight percent based on the total weight of the interlayer film.

11. The visually observable fluorescent display of claim 1, wherein the fluorophore(s) and/or the UV absorber(s) are applied to respective surfaces of said first layer by coating, printing, transfer, or spraying onto the surface.

12. The visually observable fluorescent display of claim 1, further comprising at least one further plasticized polyvinyl acetal layer in direct contact with said first layer.

13. The visually observable display of claim 1, comprising a plurality of plasticized polyvinyl acetal layers, one of said plurality of polyvinyl acetal layers being said first polyvinyl acetal layer, the interlayer film containing no barrier film.

14. The visually observable fluorescent display of claim 6, wherein the plasticizer content of the interlayer film is from 18 to 36 weight percent based on the total weight of the interlayer film.

15. The visually observable fluorescent display of claim 6, wherein the fluorophore(s) and/or the UV absorber(s) are applied to respective surfaces of said first layer by coating, printing, transfer, or spraying onto the surface.

16. The visually observable fluorescent display of claim 6, further comprising at least one further plasticized polyvinyl acetal layer in direct contact with said first layer.

17. The visually observable display of claim 6, comprising a plurality of plasticized polyvinyl acetal layers, one of said plurality of polyvinyl acetal layers being said first polyvinyl acetal layer, the interlayer film containing no barrier film.

18. The visually observable fluorescent display of claim 1 wherein all fluorophore(s) are contained in said first layer of plasticized polyvinyl acetal.

19. The visually observable fluorescent display of claim 6 wherein all fluorophore(s) are contained in said first layer of plasticized polyvinyl acetal.

* * * * *